July 9, 1935.  J. H. ERTER  2,007,525
FRACTIONATING TOWER
Filed Sept. 29, 1933  2 Sheets-Sheet 1

INVENTOR
John H. Erter
BY
Thos. E. Sefield
ATTORNEY

July 9, 1935.  J. H. ERTER  2,007,525

FRACTIONATING TOWER

Filed Sept. 29, 1933  2 Sheets-Sheet 2

INVENTOR
John H. Erter
By Thos. E. Scofield
ATTORNEY

Patented July 9, 1935

2,007,525

UNITED STATES PATENT OFFICE 2,007,525

FRACTIONATING TOWER

John H. Erter, New York, N. Y., assignor to Alco Products Incorporated, New York, N. Y., a corporation of Delaware Application September 29, 1933, Serial No. 691,493

4 Claims. (Cl. 261—114)

My invention relates to a fractionating tower for hydrocarbon oils and more particularly to an improved fractionating tower baffle construction.

In the fractionation of hydrocarbon oils, oil vapors are introduced into the tower at a point of flash and allowed to pass upwardly countercurrent to reflux condensate formed therein on a series of fractionating decks or trays. The vapors rise through the tower and the liquid reflux condensate flows downwardly through the tower. Vapors having different boiling points collect upon the trays progressively, the lighter condensates collecting on the upper trays. In order to prevent entrained liquid particles from the still, which heats the hydrocarbon oil to distillation temperature before it is flashed into the fractionating tower, from passing up the tower and contaminating the various reflux condensates, baffles are provided. I propose to provide a novel and efficient baffle structure.

As the uncondensed vapors are withdrawn from the top of the tower, entrained liquid particles of hydrocarbon oil of higher boiling point than the desired end product are carried out with the vapors. In order to prevent this, I provide baffles in the path of the vapors and, at the same time, utilize the baffles in a truss construction, enabling me to eliminate a hemispherical head for the fractionating tower.

The object of my invention is to provide an improved fractionating tower baffle construction as pointed out above.

In the accompanying drawings which form part of the instant specification and are to be read in conjunction therewith and in which like reference numerals are used to represent like parts in the various views.

In general, my invention contemplates the use of inclined baffle bundles made of a group of angles assembled to provide a circuitous passageway for the vapors, in order to prevent liquid particles from contaminating the side stream products withdrawn from the tower, or the vapors withdrawn overhead. The baffles themselves are sufficiently strong to act as strength members supporting the head of the tower, enabling me to eliminate a hemispherical head construction such as has been used hitherto for purposes of strength. This strength is needed because fractionating towers are frequently operated under partial vacuums. The head of the tower must therefore, be strong enough to withstand external pressure.

Figure 3:
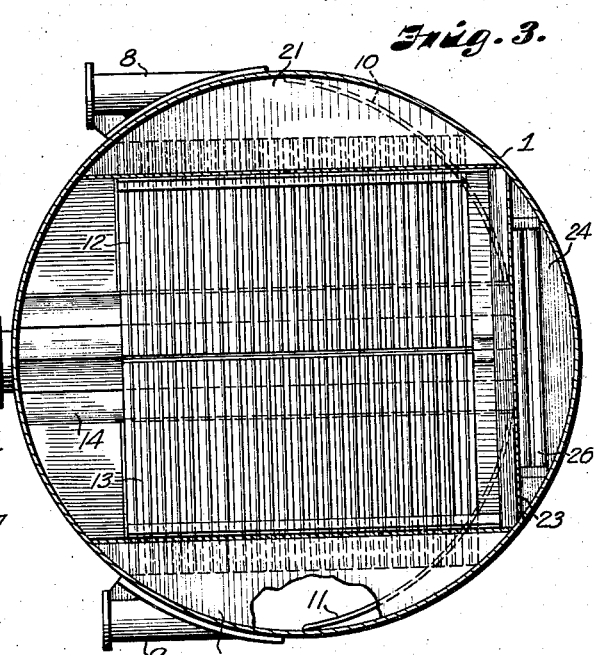
Figure 3 is a sectional view taken on a line 3—3 of Figure 1.
Figure 4:
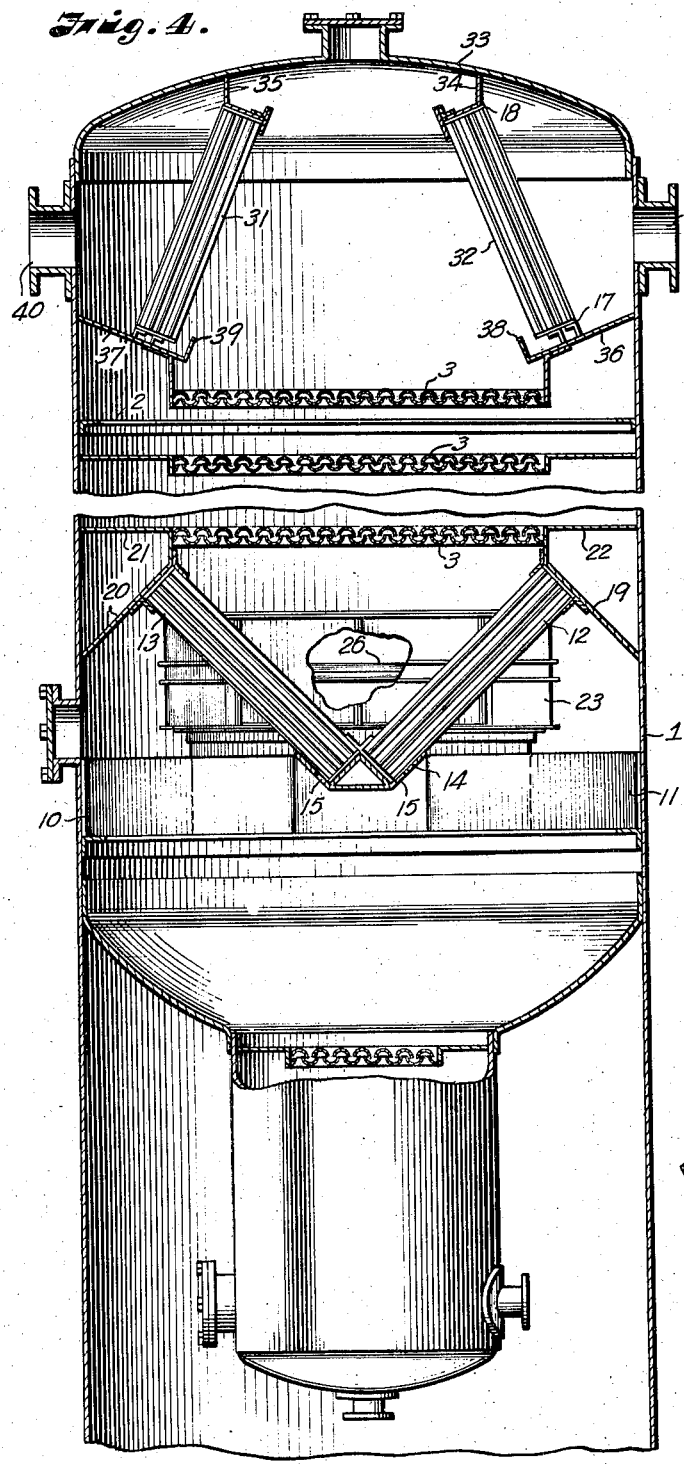
Figure 4 is an enlarged sectional view with a part of the tower broken away, taken on a line 4—4 of Figure 1.
Figure 5:
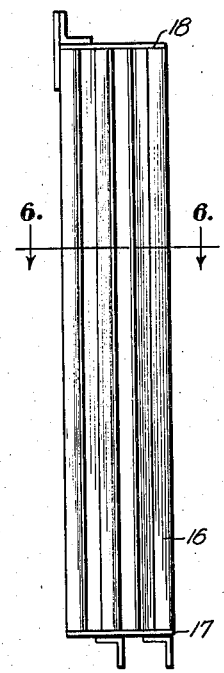
Figure 5 is an elevation of a baffle bundle used in carrying out my invention.
Figure 6:
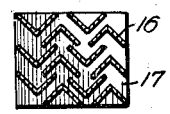
Figure 6 is a sectional view taken on a line 6—6 of Figure 5.
Figure 7:
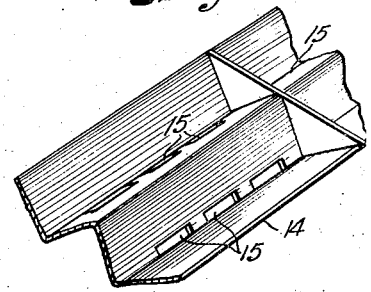
Figure 7 is a perspective view of a detail showing the supporting saddle for the baffles at the point of flash.

More particularly referring now to the drawings, a shell or casing 1 is built in any suitable manner such as by riveting or welding plates, and is provided internally with circular stringers 2 which act as strengthening members and as supports for the tray assemblies 3. The tray assemblies are a plurality of troughs and made in accordance with the construction shown in United States patent to John S. Wallis, No. 1,882,104, bearing date of October 11, 1932. Draw-offs for side streams are provided at 4, 5, 6, and 7. The oil, which is heated to distillation temperature, is divided into two streams and allowed to enter the tower through inlet pipes 8 and 9, which are disposed tangentially of the tower and set to discharge against swirl plates 10 and 11, underneath a pair of sets of inclined bundles of baffles 12 and 13. The baffle bundles 12 and 13 are supported in a saddle member 14, as can readily be seen by reference to Figures 4 and 7. A plurality of holes 15 are provided in the bottom of the saddle member to permit the entrained oil removed from the vapors to flow downwardly. The baffle bundles 12 and 13 comprise a plurality of groups of angles or other suitable structural shapes 16 as can readily be seen by reference to Figure 6. The angles 16 are mounted between shoes 17 and 18 by welding or in any other suitable manner as can readily be seen by reference to Figure 5. A plurality of groups thus formed are supported along the saddle to form a continuous row of baffles as can readily be seen by reference to Figure 3. The tops of the baffles are supported in any suitable manner such as by members 19 and 20 over which are positioned dead plates 21 and 22 so that the vapors must pass through the baffles before ascending through the tower. A partition 23 extends across one side of the tower in the region of the point of flash to form a segmental space 24 in which a stripping section is disposed. The stripping section comprises a plurality of trays 25 and 26 and has, at its lower end, a pipe 27 into which open steam is admitted. The vapors which have not been condensed on the top tray 30 pass into the head portion of the tower between head baffle groups 31 and 32. These baffles are made of a series of bundles of angles similar to baffle bundles 16 shown in Figure 5, such as used in flash point baffles 12 and 13.

Figure 1:
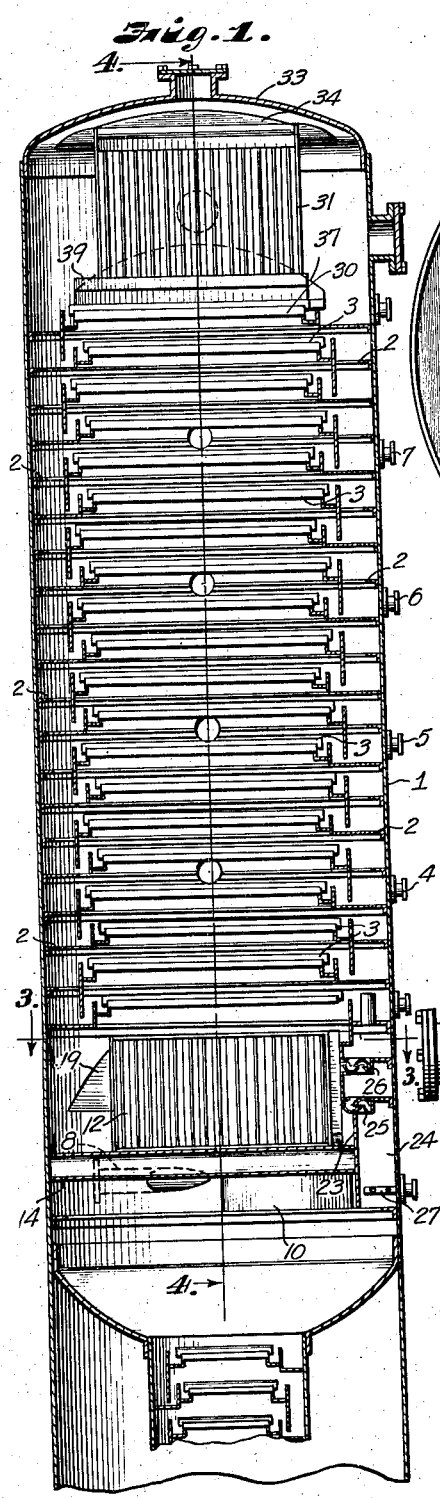
Figure 1 is a sectional elevation of a fractionating tower equipped with one mode of carrying out my invention.
Figure 2:
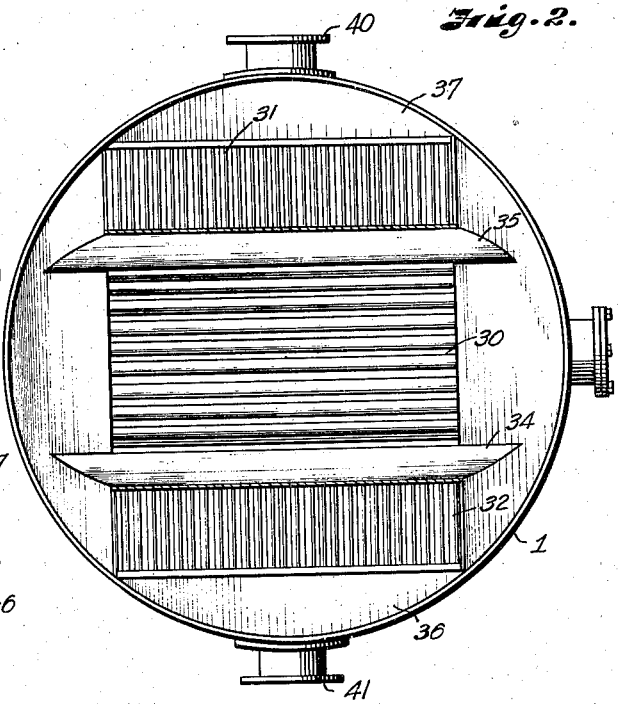
Figure 2 is a plan view of a fractionating tower, shown in Figure 1, with the head of the tower removed.

It will be observed that head baffles 31 and 32 are attached to the tower head 33 by plates 34 and 35. These plates can be seen by reference to Figure 2 and are welded to the tower head 33. The lower portions of the baffles 31 and 32 are secured to plates 36 and 37, which are equipped with lips 38 and 39, adapted to form pools to prevent the escape of vapors therethrough. Liquid knocked down from the vapors collects on plates 36 and 37, overflows ledges 38 and 39, and flows down the tower. The vapors passing through the inclined baffles go through ports 40 and 41, which are adapted to be connected to a pair of pipe lines which emerge to a single line, passing to the condenser.

It is believed that the operation of my improved tower construction will be apparent from the foregoing description. Oil heated to distillation temperature is discharged into the tower through inlet pipes 8 and 9 to the swirl plates 10 and 11 and give a tangential motion. The vapors pass through the baffle bundles 12 and 13 and rise upwardly, the constituents thereof condensing on the various trays according to their boiling points, and furnishing reflux which passes down the tower as is well understood by those skilled in the art. The uncondensed vapors pass through baffle bundles 31 and 32. The head baffle bundles act as a truss for supporting the head of the tower. By this means, the hemispherical head construction necessary in a vacuum tower is effected, thereby giving a cheaper and a better construction. It will be noted that the vapors must change their course 90 degrees in passing through vapor outlet ports 40 and 41. The inclined baffle bundles present a greater baffle area. In addition, the inclined arrangement places the locus of support for the tower head 33 at a more advantageous point. The swirling motion given to the oil led into the tower tends to separate the heavy liquid particles by centrifugal force. Due to the improved baffling arrangement, the side streams are not contaminated, resulting in more satisfactory products and the tower is lessened in height inasmuch as the desired fractionation can be obtained by eliminating the contamination which would otherwise occur if entrained particles of heavy oil were allowed to rise with the vapors within the tower.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A fractionating tower including in combination a shell, a plate positioned within said shell, a pair of inlet pipes located on opposite sides of said shell and disposed to discharge tangentially of said plate, a nest of inclined baffles positioned above said inlet pipes and extending across said shell, said baffles being formed of angle bars.

2. A fractionating tower including in combination a shell, a plate positioned within said shell, a pair of inlet pipes located on opposite sides of said shell and disposed to discharge tangentially of said plate, a nest of inclined baffles positioned above said inlet pipes and extending across said shell, said nest of baffles being comprised of a plurality of bundles of angle bars inclined to each other and inclined to the longitudinal axis of said shell.

3. A fractionating tower for fractionating hydrocarbon oils under subatmospheric pressure including in combination a shell, a tangentially directed inlet to the shell, a plurality of inclined baffles disposed across said shell above said inlet, a plurality of fractionating decks above said baffles, a head, a vapor outlet pipe and a plurality of inclined baffles extending between said shell and said head interposed between the top fractionating deck and said vapor outlet pipe, said last named baffles acting as supports for said head.

4. A fractionating tower including in combination a shell, a plate positioned within said shell, a pair of inlet pipes located on opposite sides of said shell and disposed to discharge tangentially of said plate, a nest of inclined baffles positioned above said inlet pipes and extending across said shell, a head for said tower and a plurality of inclined baffles extending between said head and said shell.

JOHN H. ERTER.